US011863931B2

(12) United States Patent
Shao et al.

(10) Patent No.: US 11,863,931 B2
(45) Date of Patent: Jan. 2, 2024

(54) SPEAKER

(71) Applicant: AAC Microtech (Changzhou) Co., Ltd., Changzhou (CN)

(72) Inventors: Tao Shao, Shenzhen (CN); Xudong Yan, Shenzhen (CN); Xiaojiang Gu, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 65 days.

(21) Appl. No.: 17/833,746

(22) Filed: Jun. 6, 2022

(65) Prior Publication Data

US 2023/0199372 A1 Jun. 22, 2023

(30) Foreign Application Priority Data

Dec. 21, 2021 (CN) ......................... 202111571521.9

(51) Int. Cl.

| | |
|---|---|
| ***H04R 1/28*** | (2006.01) |
| ***H04R 1/02*** | (2006.01) |
| ***H04R 9/02*** | (2006.01) |
| ***H04R 9/06*** | (2006.01) |
| *H04R 7/04* | (2006.01) |

(52) U.S. Cl.

CPC ........... *H04R 1/2811* (2013.01); *H04R 1/026* (2013.01); *H04R 9/027* (2013.01); *H04R 9/06* (2013.01); *H04R 7/04* (2013.01)

(58) Field of Classification Search

CPC .... H04R 1/026; H04R 1/2811; H04R 1/2819; H04R 1/30; H04R 7/04; H04R 9/025; H04R 9/027; H04R 9/06

See application file for complete search history.

(56) References Cited

U.S. PATENT DOCUMENTS

2020/0213746 A1* 7/2020 Song ........................ H04R 7/16

* cited by examiner

*Primary Examiner* — Kile O Blair

(74) *Attorney, Agent, or Firm* — W&G Law Group

(57) ABSTRACT

The present application discloses a speaker, including a shell and a speaker unit. The speaker unit includes a frame, and a magnetic path assembly and a vibration assembly; wherein, a guide pipe is also arranged in the receiving space. Compared with the related art, the present invention has the advantages that the guide pipe having a first through hole is provided; a magnetic bowl is provided with a second through hole in a penetrating manner; a main magnet is provided with a third through hole in a penetrating manner; a support is provided with a fourth through hole in a penetrating manner; all the above through holes are communicated in sequence. Thus, air of a region of the rear cavity can be introduced to the front cavity, which achieves effects of increasing the loudness of the speaker and optimizing the acoustic performance.

10 Claims, 6 Drawing Sheets

SPEAKER

TECHNICAL FIELD

The present application relates to the technical field of electroacoustic transformation, in particular to a speaker.

BACKGROUND

With the rapid development of an automotive electronic technology, vehicle-mounted infotainment and info-communication are gradually attracting people's attention. A car audio system plays a key role as an important part of a vehicle-mounted infotainment and info-communication system.

As a core component of a sound production device such as a car audio system, a speaker has a limited installation position. Those skilled in the art need to design a speaker which takes up a smaller space. However, this structural design requirement will seriously affect the acoustic performance of the speaker, resulting in the flaw that the acoustic performance cannot meet the sound quality requirements.

Therefore, it is necessary to improve the structure of the speaker to optimize the structure in a limited space to optimize the acoustic performance.

SUMMARY

In view of the above problems, the present application provides a speaker, so as to solve the technical problems in the related art. The speaker can achieve effects of increasing the loudness of a horn and optimizing the acoustic performance.

The present invention provides a speaker, including a shell having a receiving space, and a speaker unit received in the receiving space; the speaker unit includes a frame, and a magnetic path assembly and a vibration assembly which are arranged in the frame; the speaker unit divides the receiving space into a front cavity close to the vibration assembly and a rear cavity close to the magnetic path assembly; wherein, the magnetic path assembly includes a magnetic bowl, and a main magnet and an auxiliary magnet which are arranged on the magnetic bowl; the auxiliary magnet surrounds an outer periphery of the main magnet; a magnetic gap is formed between the main magnet and the auxiliary magnet;

the vibration assembly includes a diaphragm and a voice coil connected to the diaphragm; an outer edge of the diaphragm is connected to the frame; an inner edge of the diaphragm is connected with a support; one end of the support away from the diaphragm is supported onto the main magnet; one end of the voice coil away from the diaphragm extends into the magnetic gap;

a guide pipe is also arranged in the receiving space; one end of the guide pipe is fixed to the magnetic bowl, and the other end of the guide pipe extends into the rear cavity;

the guide pipe is provided with a first through hole in a penetrating manner; the magnetic bowl is provided with a second through hole in a penetrating manner; the main magnet is provided with a third through hole in a penetrating manner; the support is provided with a fourth through hole in a penetrating manner; and the first through hole, the second through hole, the third through hole, and the fourth through hole are communicated in sequence.

According to the above-mentioned speaker, optionally, the magnetic path assembly further includes a main pole core and an auxiliary pole core; the main pole core is attached to a surface of the main magnet; the auxiliary pole core is attached to a surface of the auxiliary magnet; the support is supported onto the main pole core; the main pole core is provided with a fifth through hole in a penetrating manner; and the first through hole, the second through hole, the third through hole, the fifth through hole and the fourth through hole are communicated in sequence.

According to the above-mentioned speaker, optionally, several convex sheets are convexly arranged on an outer circumferential surface of the auxiliary pole core, and several grooves each matched with the several convex sheets are formed in the frame.

According to the above-mentioned speaker, optionally, the guide pipe includes a straight pipe section and a disk-shaped pipe section; one end of the straight pipe section is fixed on the magnetic bowl; and the other end of the straight pipe section is connected to the disk-shaped pipe section.

According to the above-mentioned speaker, optionally, the diaphragm includes a first annular membrane, a second annular membrane, and a horn ring; an outer edge of the first annular membrane is connected to the frame; an inner edge of the first annular membrane is connected to an outer edge of the horn ring; an inner edge of the horn ring is connected to an outer edge of the second annular membrane; and an inner edge of the second annular membrane is connected to the support.

According to the above-mentioned speaker, optionally, a bottom of the horn ring is provided with a connector; and the voice coil is fixed at one end of the connector away from the horn ring.

According to the above-mentioned speaker, optionally, several vent holes are formed in a side wall surface of the connector.

According to the above-mentioned speaker, optionally, the frame includes an outer barrel body and an inner barrel body coaxially arranged in the outer barrel body; the magnetic path assembly is received in the inner barrel body; and the vibration assembly is received in the outer barrel body.

According to the above-mentioned speaker, optionally, a corrugated sheet is arranged between the connector and the inner barrel body.

According to the above-mentioned speaker, optionally, several lugs are convexly arranged on an outer circumferential surface of the outer barrel body, and the lugs are provided with mounting holes.

Compared with the related art, the present invention has the advantages that the guide pipe having a first through hole is provided; a magnetic bowl is provided with a second through hole in a penetrating manner; a main magnet is provided with a third through hole in a penetrating manner; a support is provided with a fourth through hole in a penetrating manner; and the first through hole, the second through hole, the third through hole, and the fourth through hole are communicated in sequence. Thus, air of a region of the rear cavity can be guided to the front cavity, which achieves effects of increasing the loudness of the speaker and optimizing the acoustic performance.

BRIEF DESCRIPTION OF THE DRAWINGS

By reading the detailed description in the preferred specific implementation modes below, various other advantages and benefits will become clear to those of ordinary skill in the art. The accompanying drawings are only used for the purpose of illustrating the preferred implementation modes, and are not considered as a limitation to the present application. Furthermore, throughout the drawings, the same reference numerals are used to denote the same components. In the drawings.

Figure 1:
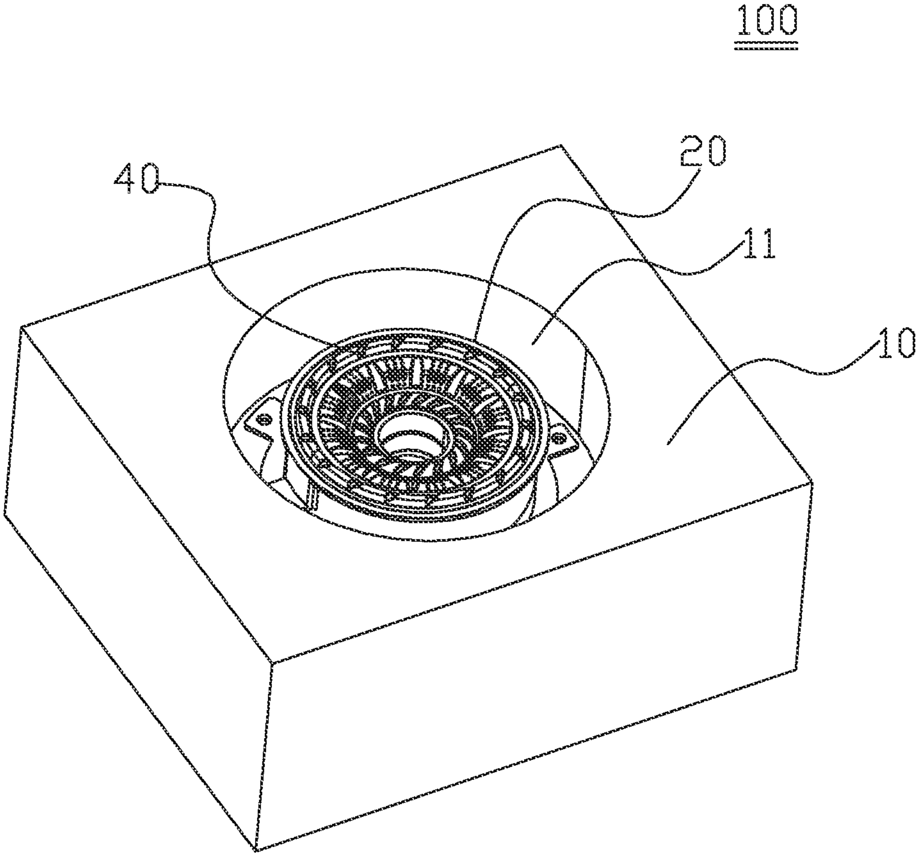
FIG. 1 is an isometric view of an entire structure of the present invention.

In the drawings, the attached drawings may not be drawn to actual scales.

Reference numerals in the drawings for the detailed description are as follows:

10: shell; 11: front cavity; 12: rear cavity;

20: frame; 21: outer barrel body; 22: inner barrel body; 23: lug; 24: mounting hole; 25: groove;

30: magnetic path assembly; 31: magnetic bowl; 32: main magnet; 33: auxiliary magnet; 34: main pole core; 35: auxiliary pole core; 36: second through hole; 37: third through hole; 38: fifth through hole; 39: convex sheet;

40: vibration assembly; 41: diaphragm; 411: first annular membrane; 412: second annular membrane; 413: horn ring; 42: support; 43: voice coil; 44: connector; 45: fourth through hole; 46: vent hole; 47: corrugated sheet;

50: guide pipe; 501: straight pipe section; 502: disk-shaped pipe section; 51: first through hole;

100: speaker.

DETAILED DESCRIPTION OF THE EMBODIMENT

The embodiment described below with reference to the drawings are exemplary, and are only intended to explain the present invention, and should not be construed as limiting the present invention.

As shown in FIG. 1-10, the present invention provides a speaker 100, including a shell 10 having a receiving space, and a speaker unit received in the receiving space. The speaker unit includes a frame 20, and a magnetic path assembly 30 and a vibration assembly 40 which are arranged in the frame 20.

As a carrying component of the speaker 100, the frame 20 achieves an effect of receiving the vibration assembly 40 and the magnetic path assembly 30. The frame 20 may be made of a metal material, or may be made of a plastic material, which is not limited here.

Figure 7:
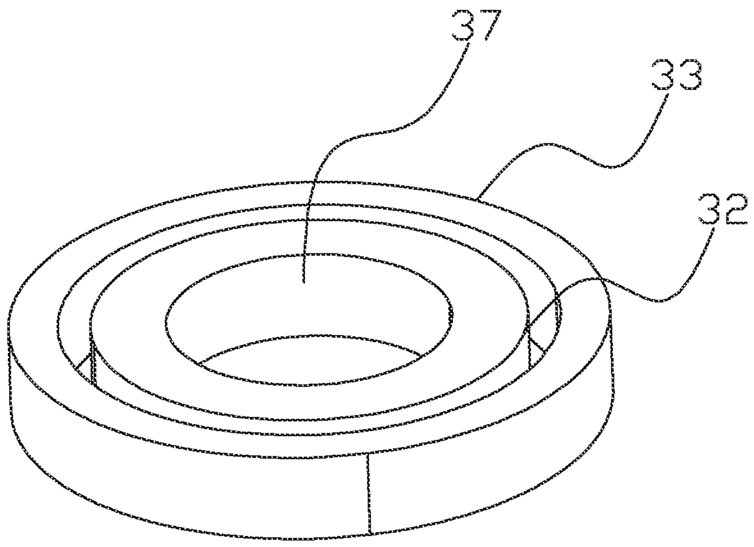
FIG. 7 is an isometric view of a main magnet and an auxiliary magnet of the present invention.

The speaker unit divides the receiving space into a front cavity 11 close to the vibration assembly 40 and a rear cavity 12 close to the magnetic path assembly 30. Wherein, the magnetic path assembly 30 is used for providing a magnetic field for the speaker 100. The magnetic field is an important power source for vibration of the speaker 100 to produce a sound. The magnetic path assembly 30 includes a magnetic bowl 31, and a main magnet 32 and an auxiliary magnet 33 which are arranged on the magnetic bowl 31. Referring to FIG. 7, the auxiliary magnet 33 surrounds an outer periphery of the main magnet 32; and a magnetic gap is formed between the main magnet 32 and the auxiliary magnet 33. In some embodiments, the main magnet 32 is of a disk structure, and the auxiliary magnet 33 is a ring structure. The main magnet 32 is arranged in a space in the ring structure, and axial directions of the main magnet 32 and the auxiliary magnet 33 basically overlap each other.

The vibration assembly 40 includes a diaphragm 41 and a voice coil 43 connected to the diaphragm 41. When the speaker 100 works, the vibration assembly 40 can generate vibration under the action of the magnetic field of the magnetic path assembly 30 to produce a sound in the front cavity 11. An outer edge of the diaphragm 41 is connected to the frame 20; an inner edge of the diaphragm 41 is connected with a support 42; one end of the support 42 away from the diaphragm 41 is supported onto the main magnet 32; and one end of the voice coil 43 away from the diaphragm 41 extends into the magnetic gap. When an alternating current is made to the voice coil 43, under the action of the magnetic field of the magnetic path assembly 30, the voice coil 43 will be stressed by an alternating push force to generate an alternating motion, thus driving the diaphragm 41 to vibrate together. The diaphragm 41 pushes air to produce a sound.

A guide pipe 50 is also arranged in the receiving space; and one end of the guide pipe 50 is fixed on a magnetic bowl 31, and the other end of the guide pipe 50 extends into the rear cavity 12. The guide pipe 50 is provided with a first through hole 51 in a penetrating manner; the magnetic bowl 31 is provided with a second through hole 36 in a penetrating manner; the main magnet 32 is provided with a third through hole 37 in a penetrating manner; the support 42 is provided with a fourth through hole 45 in a penetrating manner; and the first through hole 51, the second through hole 36, the third through hole 37, and the fourth through hole 45 are communicated in sequence. Optionally, the second through hole 36 penetrates through a middle region of a magnet, and the third through hole 37 penetrates through a middle region of the main magnet 32, so as to balance the magnetic field. The axial directions of the second through hole 36, the third through hole 37, and the fourth through hole 45 basically overlap each other.

The second through hole 36, the third through hole 37, and the fourth through hole 45 may be of a regular shape or an irregular shape. The regular shape may be one of circle, square, triangle, and polygon. Of course, other unlisted regular shapes also fall within the protection scope of the present invention.

When the speaker 100 is electrified to work, the diaphragm 41 vibrates up and down along a height direction of the frame 20. At the same time, the air in the rear cavity 12 can smoothly flow out of the first through hole 51, the second through hole 36, the third through hole 37, and the fourth through hole 45 into the front cavity 11, which can effectively avoid production of noise and achieve the effects of increasing the loudness of the speaker and optimizing the acoustic performance.

Figure 2:
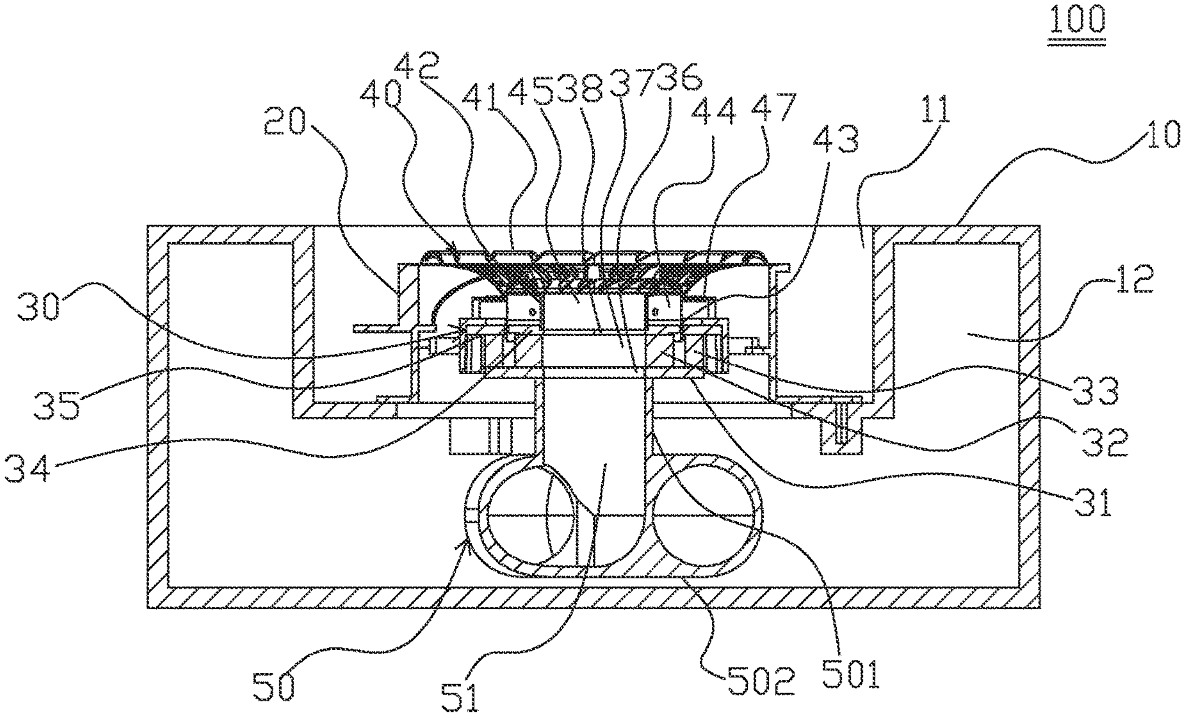
FIG. 2 is a cross-sectional view of an entire structure of the present invention.
Figure 8:
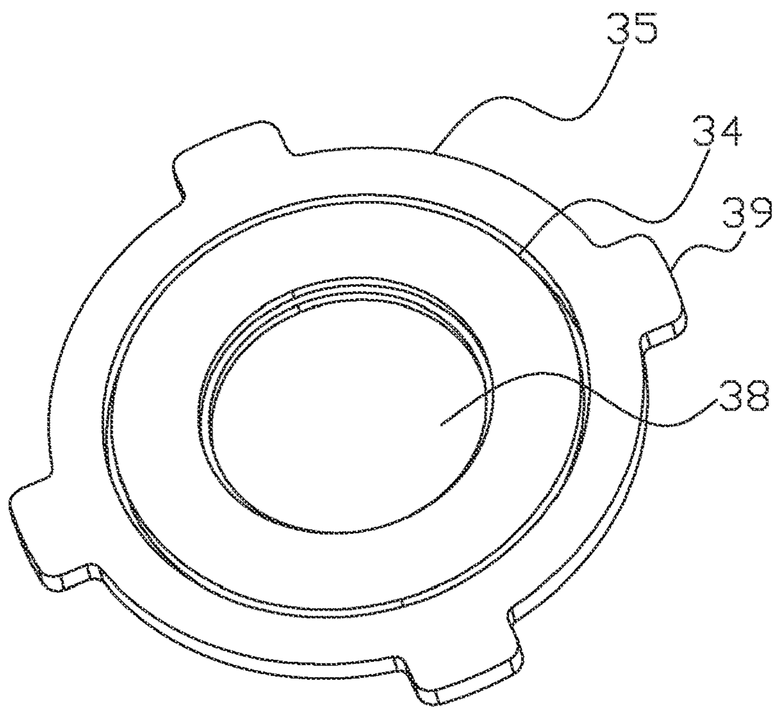
FIG. 8 is an isometric view of a main pole core and an auxiliary pole core of the present invention.

Referring to FIG. 2 and FIG. 8, the magnetic path assembly 30 further includes a main pole core 34 and an auxiliary pole core 35; the main pole core 34 is attached to a surface of the main magnet 32; and the auxiliary pole core 35 is attached to a surface of the auxiliary magnet 33. In some embodiments, the main pole core 34 is of a disk structure, and the auxiliary pole core 35 is a ring structure. The main pole core 34 is arranged in a space of the ring structure; and axial directions of the main pole core 34 and the auxiliary pole core 35 basically overlap each other. The main pole core 34 is provided with a fifth through hole 38 in a penetrating manner. The first through hole 51, the second through hole 36, the third through hole 37, the fifth through hole 38, and the fourth through hole 45 are communicated in sequence. Those skilled in the art can known that the shape of the fifth through hole 38 may have more transformation ways, such as square and other regular shapes or irregular shapes, which is not limited here.

Referring to FIG. 2 and FIG. 8, several convex sheets 39 are convexly arranged on an outer circumferential surface of the auxiliary pole core 35, and several grooves 25 each matched with the several convex sheets 39 are formed in the frame 20. Thus, effects of positioning the auxiliary pole core 35 and limiting the rotation and radial movement of the auxiliary pole core 35 are achieved.

Further, the support 42 is supported on the main pole core 34; the main pole core 34 is provided with a step slot at the fifth through hole 38. The support 42 is abutted against the step slot of the main pole core 34, thus limiting the movement of the support 42 in a radial direction.

The guide pipe 50 includes a straight pipe section 501 and a disk-shaped pipe section 502 which are optionally integrated. The first through hole 51 penetrates through the guide pipe along the axial directions of the straight pipe section 501 and the disk-shaped pipe section 502; and one end of the straight pipe section 501 is fixed on the magnetic bowl 31, and the other end of the straight pipe section 501 is connected to the disk-shaped pipe section 502. An extending direction of the straight pipe section 501 is parallel to the height direction of the frame 20. The disk-shaped pipe section 502 is a horizontally disposed spiral disk structure to reduce an occupied space. Meanwhile, a passing path of the air is prolonged, and the shortcoming of a limited arrangement position due to an extremely large volume of the guide pipe 50 in the related art is avoided, so that the guide pipe 50 can have more arrangement positions.

Figure 3:
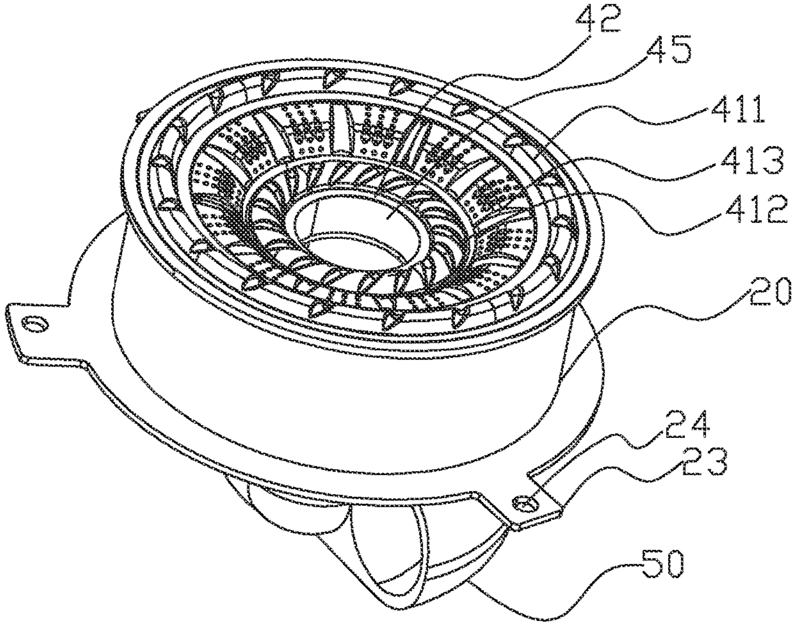
FIG. 3 is an isometric view in a shell-hiding state of the present invention.
Figure 5:
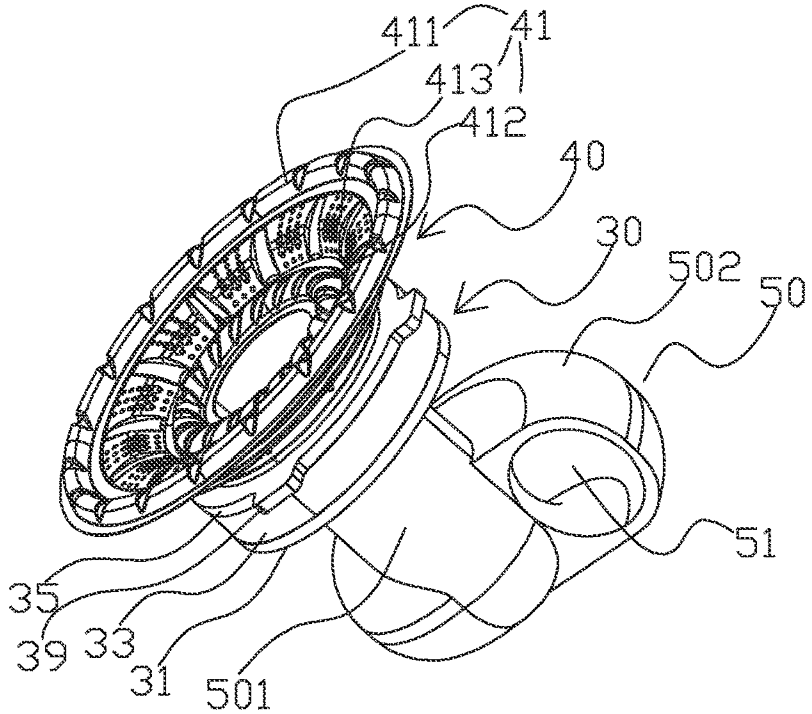
FIG. 5 is an isometric view in a frame-hiding state of the present invention.
Figure 6:
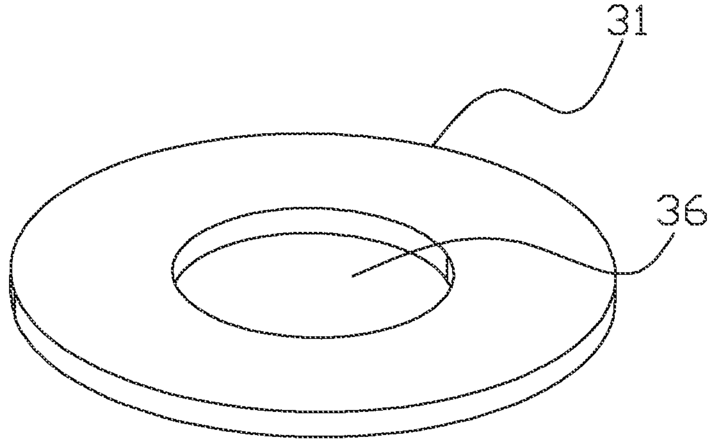
FIG. 6 is an isometric view of a magnetic bowl of the present invention.

Referring to FIG. 3 and FIG. 5, the diaphragm 41 includes a first annular membrane 411, a second annular membrane 412, and a horn ring 413; an outer edge of the first annular membrane 411 is connected to the frame 20; an inner edge of the first annular membrane 411 is connected to an outer edge of the horn ring 413; an inner edge of the horn ring 413 is connected to an outer edge of the second annular membrane 412; and an inner edge of the second annular membrane 412 is connected to the support 42.

Optionally, referring to FIG. 2, a step slot is formed in a junction between an inner wall surface and a top wall of the outer barrel body 21; an edge of the first annular membrane 411 is lapped and fixed on the step slot, thus limiting the movement of the first annular membrane 411 in the radial direction.

Figure 9:
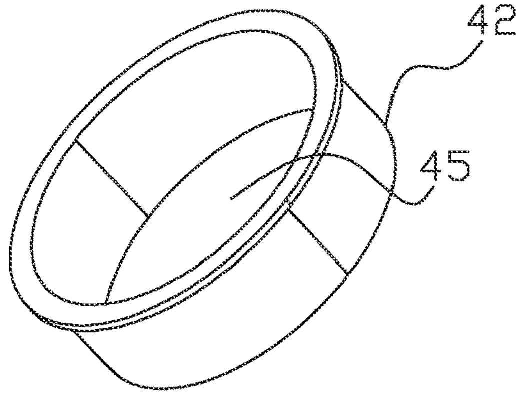
FIG. 9 is an isometric view of a support of the present invention.

Referring to FIG. 9, a top edge of the support 42 outwardly radially horizontally extends to form a bending portion, and a rim of the second annular membrane 412 is lapped and fixed to the bending portion. In this design manner, a contact area between the second annular membrane 412 and the support 42 can be enlarged, and the stability of connection between the second annular membrane 412 and the support 42 can be improved.

Figure 10:
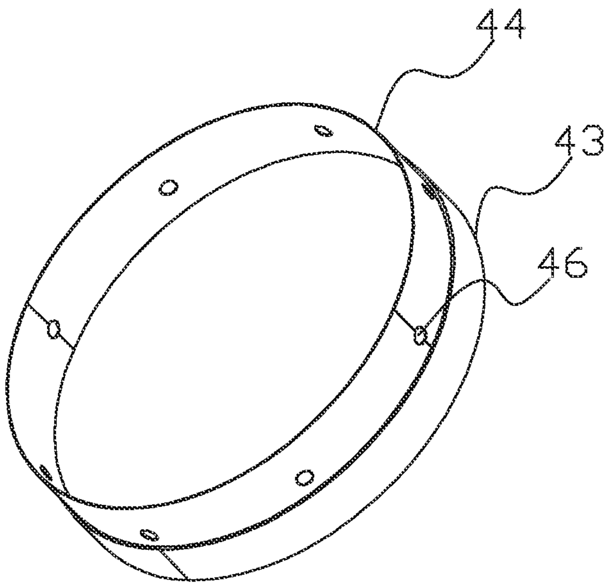
FIG. 10 is an isometric view of a connector and a voice coil of the present invention.

Referring to FIG. 2 and FIG. 10, a bottom of the horn ring 413 is provided with a connector 44. The voice coil 43 is fixed to one end of the connector 44 away from the horn ring 413. The connector 44 is a barrel structure. The connector 44 is optionally integrated and is connected to the horn ring 413. This design manner enhances the overall strength of the diaphragm 41, thus improving the high-frequency characteristic of the speaker 100.

The voice coil 43 extends into the magnetic gap. The voice coil 43 is used for introducing a sound signal and making a current. The connector 44 can be driven by the voice coil 43 to vibrate, thus causing the diaphragm 41 to produce a sound. The voice coil 43 is arranged in the magnetic gap. When an alternating current is made into the voice coil 43, under the action of the magnetic field of the magnetic path assembly 30, the voice coil 43 will be stressed by an alternating push force to generate an alternating motion, thus driving the connector 44 and the diaphragm 41 to vibrate together. The diaphragm 41 pushes the air to produce a sound. By adopting the structure with the voice coil 43 and the connector 44, the position of the voice coil 43 can be moved down towards the magnetic bowl 31 to increase the magnetic field utilization rate of the voice coil 43 and increase a BL value, thus improving the sensitivity of the speaker 100. The BL value refers to a product of the intensity of the magnetic field in the magnetic gap and an effective wire length of the voice coil 43.

Continuing to refer to FIG. 2 and FIG. 10, several vent holes 46 are formed in a side wall surface of the connector 44. The several vent holes 46 are annularly arranged on the connector 44 at intervals. The vibration assembly 40 produces a sound by pushing the air inward or outward by the diaphragm 41. Therefore, in the vibration process of the diaphragm 41, internal and external air pressures of the connector 44 will be different, which increases the air resistance and hinders the vibration of the diaphragm 41. The vent holes 46 can allow the air get into and out of the connector 44, which can keep the internal and external air pressures of the connector 44 balanced, reduce the air resistance, and help improve the hearing of the speaker 100 under large amplitude.

Figure 4:
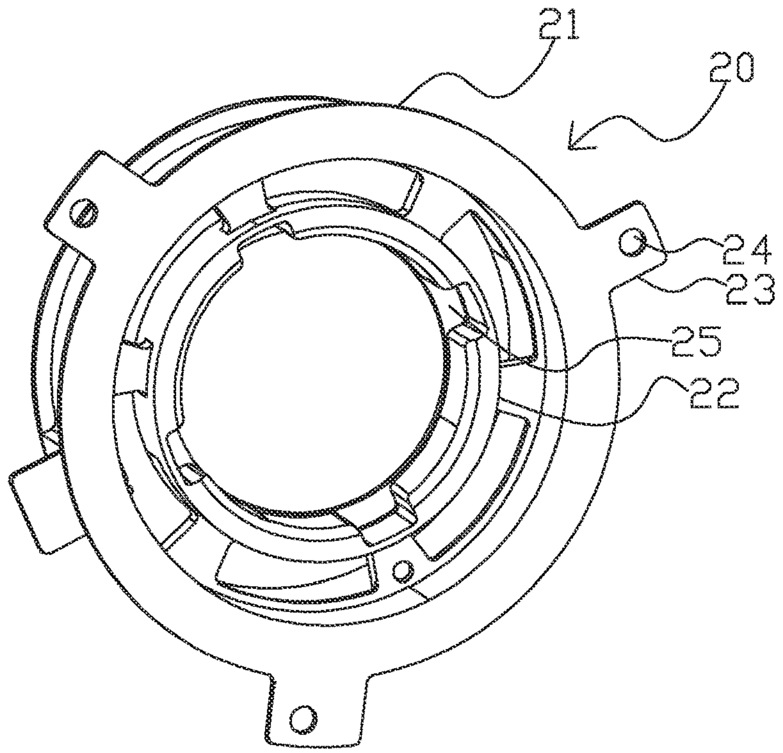
FIG. 4 is an isometric view of a frame of the present invention.

Referring to FIG. 4, in some embodiments, the frame 20 includes an outer barrel body 21 and an inner barrel body 22 coaxially arranged in the outer barrel body 21. The inner barrel body 22 and the outer barrel body 21 are connected through a rib. A length of the inner barrel body 22 is less than that of the outer barrel body 21. The axial direction of the outer barrel body 21 and the axial direction of the inner barrel body 22 basically overlap each other. The magnetic path assembly 30 is received in the inner barrel body 22. The vibration assembly 40 is received in the outer barrel body 21. Specifically, the magnetic bowl 31, the main magnet 32, the auxiliary magnet 33, the main pole core 34, and the auxiliary pole core 35 in the magnetic path assembly 30 are all received in the inner barrel body 22. The outer edge of the diaphragm 41 of the vibration assembly 40 is fixed on an inner wall surface of the outer barrel body 21. The support 42 extends into the inner barrel body 22 and is then connected to the main pole core 34. The voice coil 43 extends into the inner barrel body 22 and is then suspended in the magnetic gap. Those skilled in the art can understand that the structure of the frame 20 can have more transformation examples, which will not be enumerated here.

Referring to FIG. 2, a corrugated sheet 47 is arranged between the connector 44 and the inner barrel body 22. An inner edge of the corrugated sheet 47 is connected to the connector 44, and the inner edge of the corrugated sheet 47 is connected to the inner barrel body 22. The corrugated sheet 47 is used for providing vibration stabilizing and polarization inhibiting effects for the vibration assembly 40 such as the connector 44. The voice coil 43 is a component, which vibrates under a driving acting force, in the vibration assembly 40, that is, a source stressed by the driving force. Since the voice coil 43 is fixed on the connector 44, the connector 44 forms a connection relationship with the inner barrel body 22 by using the corrugated sheet 47. The voice coil 43 can be effectively prevented from polarizing, thus reducing the possibility that the entire vibration assembly 40 polarizes due to an unbalanced driving force.

Referring to FIG. 2 and FIG. 3, in order to facilitate fixing the frame 20 on the shell 10, several lugs 23 are convexly arranged on an outer circumferential surface of the frame 20. In some embodiments, there are three lugs 23. The three lugs 23 are annularly arranged on the outer circumferential surface of the frame 20 at equal intervals. The lugs 23 are flat plate structures. The lugs 23 are provided with mounting holes 24. Bolts are threaded in the mounting holes 24 to form threaded connection and fit, so that it is convenient to disassemble and assemble the frame 20. Of course, the frame 20 can also be fixed to the shell 10 in various ways such as adhesion or clamping, which is not limited here.

The structures, features and action effects of the present invention have been described in detail above according to the embodiment shown in the drawings. The above descriptions are only the preferred embodiment of the present invention, but the implementation scope of the present invention is not limited by the drawings. Changes made to the concept of the present invention, or modifications to equivalent embodiment with equivalent changes, shall fall within the protection scope of the present invention as long as they do not exceed the spirit covered by the description and the drawings.

What is claimed is:

1. A speaker, comprising a shell having a receiving space, and a speaker unit received in the receiving space, wherein the speaker unit comprises a frame, and a magnetic path assembly and a vibration assembly which are arranged in the frame; the speaker unit divides the receiving space into a front cavity close to the vibration assembly and a rear cavity close to the magnetic path assembly;

the magnetic path assembly comprises a magnetic bowl, and a main magnet and an auxiliary magnet which are arranged on the magnetic bowl; the auxiliary magnet surrounds an outer periphery of the main magnet; a magnetic gap is formed between the main magnet and the auxiliary magnet;

the vibration assembly comprises a diaphragm and a voice coil connected to the diaphragm; an outer edge of the diaphragm is connected to the frame; an inner edge of the diaphragm is connected with a support; one end of the support away from the diaphragm is supported onto the main magnet; one end of the voice coil away from the diaphragm extends into the magnetic gap;

wherein, a guide pipe is also arranged in the receiving space; one end of the guide pipe is fixed to the magnetic bowl, and the other end of the guide pipe extends into the rear cavity;

the guide pipe is provided with a first through hole in a penetrating manner; the magnetic bowl is provided with a second through hole in a penetrating manner; the main magnet is provided with a third through hole in a penetrating manner; the support is provided with a fourth through hole in a penetrating manner; and the first through hole, the second through hole, the third through hole, and the fourth through hole are communicated in sequence.

2. The speaker of claim 1, wherein the magnetic path assembly further comprises a main pole core and an auxiliary pole core; the main pole core is attached to a surface of the main magnet; the auxiliary pole core is attached to a surface of the auxiliary magnet; the support is supported onto the main pole core; the main pole core is provided with a fifth through hole in a penetrating manner; and the first through hole, the second through hole, the third through hole, the fifth through hole and the fourth through hole are communicated in sequence.

3. The speaker of claim 2, wherein several convex sheets are convexly arranged on an outer circumferential surface of the auxiliary pole core, and several grooves each matched with the several convex sheets are formed in the frame.

4. The speaker of claim 1, wherein the guide pipe comprises a straight pipe section and a disk-shaped pipe section; one end of the straight pipe section is fixed on the magnetic bowl; and the other end of the straight pipe section is connected to the disk-shaped pipe section.

5. The speaker of claim 1, wherein the diaphragm comprises a first annular membrane, a second annular membrane, and a horn ring; an outer edge of the first annular membrane is connected to the frame; an inner edge of the first annular membrane is connected to an outer edge of the horn ring; an inner edge of the horn ring is connected to an outer edge of the second annular membrane; and an inner edge of the second annular membrane is connected to the support.

6. The speaker of claim 5, wherein a bottom of the horn ring is provided with a connector; and the voice coil is fixed at one end of the connector away from the horn ring.

7. The speaker of claim 6, wherein several vent holes are formed in a side wall surface of the connector.

8. The speaker of claim 6, wherein the frame comprises an outer barrel body and an inner barrel body coaxially arranged in the outer barrel body; the magnetic path assembly is received in the inner barrel body; and the vibration assembly is received in the outer barrel body.

9. The speaker of claim 8, wherein a corrugated sheet is arranged between the connector and the inner barrel body.

10. The speaker of claim 8, wherein several lugs are convexly arranged on an outer circumferential surface of the outer barrel body, and the lugs are provided with mounting holes.

* * * * *